W. O. B. MERRILL.
Coal Oil Lamp.
No. 1,373. Reissued Jan. 6, 1863.
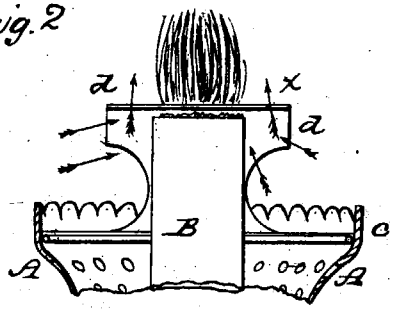
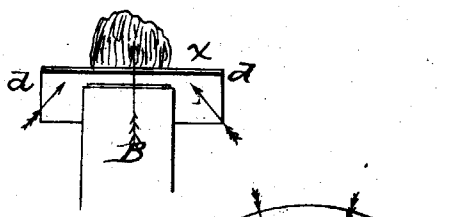
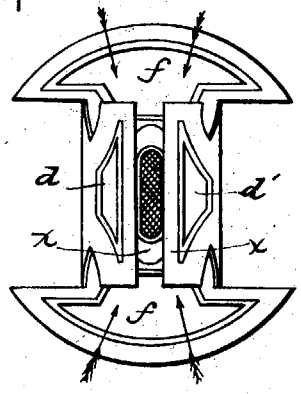
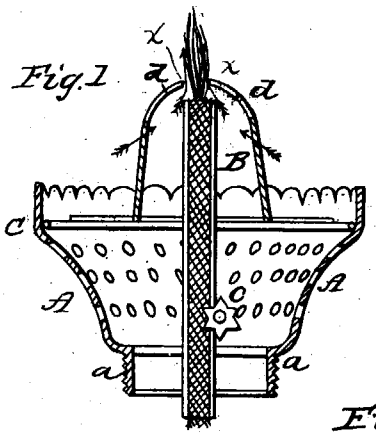
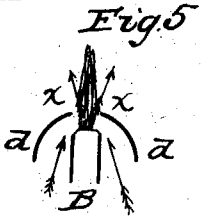
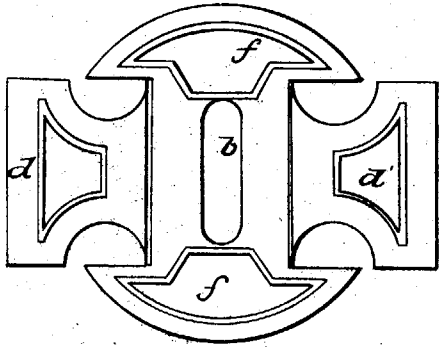
N. PETERS, Photo-Lithographer, Washington, D. C.

UNITED STATES PATENT OFFICE.

W. O. B. MERRILL, OF PHILADELPHIA, PENNSYLVANIA.

IMPROVEMENT IN COAL-OIL LAMPS.

Specification forming part of Letters Patent No. 35,533, dated June 10, 1862; Reissue No. 1,373, dated January 6, 1863.

*To all whom it may concern:*

Be it known that I, W. O. B. MERRILL, of Philadelphia, Pennsylvania, did obtain Letters Patent of the United States, dated June 10, 1862, for Improvements in Coal-Oil Lamp-Burners, which Letters Patent I now deem inoperative and invalid by reason of a defective specification; and I do hereby declare the following to be a full, clear, and exact description of the said invention, reference being had to the accompanying drawings, and to the letters of reference marked thereon.

My invention consists of two curved or inclined plates of a length greater than the width of the flat wick-tube of a coal-oil lamp, the said plates being disconnected from each other at the ends, and being otherwise arranged in respect to the wick-tube and wick essentially in the manner described hereinafter, so that the flame may burn with brilliancy and steadiness, and unaccompanied by the usual smoke and without the aid of the usual glass chimney.

In order to enable others skilled in the art to make and use my invention, I will now proceed to describe its construction and operation.

On reference to the accompanying drawings, which form a part of this specification, Figure 1 is a vertical section of a burner for coal-oil lamps with my improvement; Fig. 2, a transverse vertical section of part of Fig. 1; Fig. 3, a detached plan view of part of the burner; Fig. 4, a plan view illustrating a simple mode of constructing my improvement, and Figs. 5 and 6 diagrams illustrating my invention.

Similar letters refer to similar parts throughout the several views.

A is the outer perforated casing of the burner of an ordinary coal-oil lamp, and is provided with the usual screwed projection, *a*, for attachment to the reservoir containing the coal-oil, and with the usual tube, B, for receiving a flat wick, which can be raised or lowered at pleasure by the cog-wheel C.

The above-described parts represent portions of a coal-oil lamp-burner in common use, and have therefore been selected as a proper medium through which my improvement can be best illustrated and described and most readily understood.

Prior to explaining the mode illustrated in the accompanying drawings of carrying out my invention it will be well to describe the result of a series of careful experiments made with the view of producing a coal-oil lamp-burner in which the flame should be brilliant and smokeless in the absence of the usual glass chimney.

Adopting the usual flat wick-tube, I found that two simple curved or inclined plates (marked *d* and *d'*, and best observed on reference to diagrams, Figs. 5 and 6) could be so arranged in respect to the wick-tube, wick, and the flame as to cause the latter to burn with the greatest brilliancy and without the usual annoying smoke. I discovered, however, that in order to cause the plates to accomplish this result it was essential that the following arrangements should be strictly adhered to: First, that the upper edges, *x*, of the plates should be a short distance above the base of the flame or top of the wick; secondly, that the distance between the said edges *x* of the two plates should be such in respect to the width of the wick that the flame should not touch the plates; thirdly, that the plates should be longer than the wick-tube is wide, as best observed on reference to Fig. 2 and diagram, Fig. 6; fourthly, that the plates should not be connected together at the opposite ends; and, fifthly, that they should be so connected to the burner as to present the least possible obstruction to the free access of air from below to the base of the flame, and to its free circulation around the wick-tube. A combination of these, what may be termed "elementary," principles is embodied in my improved burner.

As regards the first requisite—namely, the altitude of the edges *x* of the plates *d* and *d'* in relation to the top of the wick-tube—that has been determined by actual experiment. The relative position shown in the drawings will suffice to serve as a guide.

As to the second feature—that of arranging the edges *x* of the plates so that, although contiguous to, they shall not be in contact with, the flame—the object is to allow a space to intervene between the plates and the flame, on both sides of the latter, for the passage through the said space of a thin stream of air, to impinge against the flame and furnish it with a continuous supply of oxygen, thereby increasing its brilliancy and preventing the generation of the usual smoke.

The third desideratum—that the plates should not be connected together at the ends—is important, as the passage of the air to the wick-tube and to the ends of the flame remains uninterrupted.

As to the fourth feature, it has been found that by making the plates longer than the wick-tube is wide the portions of the plates projecting beyond the tube, as seen in Fig. 2, serve as guides for directing the air in the course most proper for taking the desired effect on the flame.

The fifth and last requisite, and one of much importance, is that of so arranging the plates as to present the least obstruction possible to the passage of air from below to the flame.

I have found that if the plates could be suspended in mid-air in the position shown in the diagram, Fig. 5, the best results would ensue; but as this would be impracticable I make the supports of these plates, or a continuation of these plates serving as supports, as small as possible consistent with the appropriate strength, as will be seen on reference to the attachment which I will now proceed to describe.

Within the casing A, and near the upper edge of the same, is a ledge, *e*, and on this ledge rests the device, which I have termed a "smoke-consumer," the latter, in the present instance, being constructed in the peculiar manner represented by Figs. 3 and 4.

A flat plate of thin brass or other metal is reduced by stamping, cutting, or otherwise to the form represented in Fig. 4, an oblong hole, *b*, for admitting the wick-tube being formed in the middle of the plate.

The two projections *d* and *d'* are turned up from the plate so as to assume the form and relative position illustrated in Fig. 1, and these projections constitute the two plates previously alluded to. The two projections *f f*, Fig. 4, retain their original form, so as to fit snugly within the case A and rest on the ledge *e*.

It will be observed on reference to Figs. 2 and 3 that the stems or supports of the plates *d d'* are contracted as much as possible consistent with that strength and rigidity necessary for maintaining them in their proper relative position; hence they present the least possible obstruction to the air in its attempts to gain access to the top of the wick-tube.

As one plate is separate and distinct from the other, there must be a free and unintercepted passage for the air in the direction of the arrows, Fig. 3, the projecting ends of the plates serving to guide the air to the wick-tube and to cause the air to impinge against and define the form of the edge of the flame, while two constant streams of air must pass upward between the edges *x* of the plates and the flame, on both sides of the latter. In short, it will be seen that the plates have the same or nearly the same effect as though they were suspended in mid-air, as illustrated by the diagram, Fig. 5—that is, the effect of producing a well defined, steady, and brilliant flame, unaccompanied by the usual smoke, and this without the necessity of using the ordinary glass chimney.

I claim as my invention and desire to secure by Letters Patent—

Two inclined or curved plates, *d* and *d'*, of a length greater than the width of the wick-tube, the said plates being disconnected from each other at the opposite ends, and being otherwise arranged in respect to the wick-tube and wick essentially as and for purpose herein set forth.

In testimony whereof I have signed my name to this specification before two subscribing witnesses.

W. O. B. MERRILL

Witnesses:

CHARLES E. FOSTER,
C. BRAZER.